(12) United States Patent
Frykman et al.

(10) Patent No.: US 9,691,204 B2
(45) Date of Patent: Jun. 27, 2017

(54) METHOD AND APPARATUS FOR SECURE VEHICLE SYSTEM ACCESS FROM A REMOTE SYSTEM

(71) Applicant: Ford Global Technologies, LLC, Dearborn, MI (US)

(72) Inventors: William M. Frykman, Birmingham, MI (US); Ritesh Pandya, Rochester Hills, MI (US); Brian Petersen, Beverly Hills, MI (US); Joseph Paul Rork, Plymouth, MI (US); Kelly Lee Zechel, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 485 days.

(21) Appl. No.: 14/172,172

(22) Filed: Feb. 4, 2014

(65) Prior Publication Data
US 2015/0221150 A1    Aug. 6, 2015

(51) Int. Cl.
| | |
|---|---|
| *G07C 9/00* | (2006.01) |
| *B60R 25/24* | (2013.01) |
| *H04L 9/32* | (2006.01) |
| *G07C 5/00* | (2006.01) |

(52) U.S. Cl.
CPC ......... *G07C 9/00142* (2013.01); *B60R 25/24* (2013.01); *G07C 5/008* (2013.01); *H04L 9/32* (2013.01); *H04L 9/3226* (2013.01)

(58) Field of Classification Search
CPC  G07C 9/00126; G07C 9/00142; B60R 25/24; H04L 9/08; H04L 9/32; H04L 9/3226

USPC .............................................. 340/5.21, 5.72
See application file for complete search history.

(56) References Cited

U.S. PATENT DOCUMENTS

| | | | |
|---|---|---|---|
| 5,986,542 A | 11/1999 | Hyde | |
| 6,960,990 B2 | 11/2005 | McKibbon | |
| 7,548,491 B2 | 6/2009 | Macfarlane | |
| 8,335,547 B2 | 12/2012 | Otterson | |
| 2005/0009511 A1* | 1/2005 | Bostrom | H04M 1/72533 455/419 |
| 2006/0064600 A1 | 3/2006 | Polichetti et al. | |
| 2009/0002147 A1* | 1/2009 | Bloebaum | H04M 1/6075 340/466 |
| 2009/0113961 A1* | 5/2009 | Muller | B60R 25/2009 70/256 |
| 2009/0273438 A1* | 11/2009 | Sultan | G07C 9/00103 340/5.7 |

(Continued)

*Primary Examiner* — Thomas Alunkal
(74) *Attorney, Agent, or Firm* — Jennifer Stec; Brooks Kushman P.C.

(57) ABSTRACT

A system includes a processor configured to receive a vehicle-access-PIN generation request from a vehicle computing system (VCS). The processor is also configured to generate the vehicle-access-PIN. The processor is additionally configured to associate a vehicle with the vehicle-access-PIN. Further, the processor is configured to return the vehicle-access-PIN to the requesting VCS. Also, the processor is configured to receive a validation request, including a validation-PIN, from a non-vehicle computing system (NVCS). In addition, the processor is configured to validate the validation-PIN by comparison with stored vehicle-access-PINs to find a match and provide access credentials, for a vehicle associated with a stored vehicle-access-PIN that matches the validation-PIN, to the NVCS.

20 Claims, 4 Drawing Sheets

(56) References Cited

U.S. PATENT DOCUMENTS

| | | | |
|---|---|---|---|
| 2010/0241857 A1* | 9/2010 | Okude | B60R 25/24 |
| | | | 713/168 |
| 2011/0086678 A1* | 4/2011 | Suzuki | H04M 1/6091 |
| | | | 455/569.2 |
| 2012/0254960 A1* | 10/2012 | Lortz | H04L 63/104 |
| | | | 726/7 |
| 2012/0282908 A1* | 11/2012 | Nicolini | H04W 4/04 |
| | | | 455/418 |
| 2013/0005336 A1* | 1/2013 | Ayotte | H04W 12/06 |
| | | | 455/435.1 |
| 2014/0094143 A1* | 4/2014 | Ayotte | G06Q 50/18 |
| | | | 455/411 |

* cited by examiner

METHOD AND APPARATUS FOR SECURE VEHICLE SYSTEM ACCESS FROM A REMOTE SYSTEM

TECHNICAL FIELD

The illustrative embodiments generally relate to a method and apparatus for secure vehicle system access from a remote system.

BACKGROUND

Current vehicle telematics systems may leverage an in-vehicle popup to allow/deny access based on a remote signal to the vehicle. This method may use a customer email address as an identifier. Through the email identifier, the vehicle can determine whether a request from a remote system for vehicle access is approvable or not. To register a vehicle, customers are required to identify and enter a vehicle identification number VIN into a website. Although seemingly straightforward, this process can result in errors (due to the length and complexity of a VIN).

U.S. Pat. No. 6,960,990 generally relates to a method of and system for authorizing use of a mobile vehicle, in which an entry signal is received and a disarm alarm prompt from an in-vehicle telematics unit is provided in response to the entry signal. A determination is made as to whether a disarm alarm response is received and an authorization procedure is initiated based on the disarm alarm response.

U.S. Pat. No. 5,986,542 generally relates to a method of providing vehicle security against theft involving entering a PIN by using one or more buttons of a preexisting electronic device of a vehicle (an electronic device conventionally found in a vehicle that has a function other than that of providing security against theft, such as a digital odometer, a radio, a compass/information unit, or the like). If the entered PIN does not match a stored PIN, starting of the engine is prevented. Illustratively, the PIN is input into a body controller of the vehicle that compares entered PIN against a stored PIN. If the entered PIN matches the stored PIN, the body controller sends a start enable signal to an engine controller of the vehicle. Upon receipt of the start enable signal from the body controller, the engine controller enables starting of the vehicle so that the vehicle will start when the ignition switch is turned. If the entered PIN does not match the stored PIN, the body controller sends a start disable signal to the engine controller and the engine controller then disables starting of the vehicle so that the vehicle is not allowed to start when the ignition switch is turned.

SUMMARY

In a first illustrative embodiment, a system includes a processor configured to receive a vehicle-access-PIN generation request from a vehicle computing system (VCS). The processor is also configured to generate the vehicle-access-PIN. The processor is additionally configured to associate a vehicle with the vehicle-access-PIN. Further, the processor is configured to return the vehicle-access-PIN to the requesting VCS. Also, the processor is configured to receive a validation request, including a validation-PIN, from a non-vehicle computing system (NVCS). In addition, the processor is configured to validate the validation-PIN by comparison with stored vehicle-access-PINs to find a match and provide access credentials, for a vehicle associated with a stored vehicle-access-PIN that matches the validation-PIN, to the NVCS.

In a second illustrative embodiment, a method includes receiving a vehicle-access-PIN generation request from a vehicle computing system (VCS). The method further includes generating the vehicle-access-PIN and associating a vehicle with the vehicle-access-PIN. In addition, the method includes returning the vehicle-access-PIN to the requesting VCS. The method further includes receiving a validation request, including a validation-PIN, from a non-vehicle computing system (NVCS). Also, the method includes validating the validation-PIN by comparison with stored vehicle-access-PINs to find a match and providing access credentials, for a vehicle associated with a stored vehicle-access-PIN that matches the validation-PIN, to the NVCS.

In a third illustrative embodiment, a non-transitory computer-readable storage medium stores instructions that, when executed by a processor, cause the processor to perform a method including receiving a vehicle-access-PIN generation request from a vehicle computing system (VCS). The method further includes generating the vehicle-access-PIN and associating a vehicle with the vehicle-access-PIN. In addition, the method includes returning the vehicle-access-PIN to the requesting VCS. The method further includes receiving a validation request, including a validation-PIN, from a non-vehicle computing system (NVCS). Also, the method includes validating the validation-PIN by comparison with stored vehicle-access-PINS to find a match and providing access credentials, for a vehicle associated with a stored vehicle-access-PIN that matches the validation-PIN, to the NVCS.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
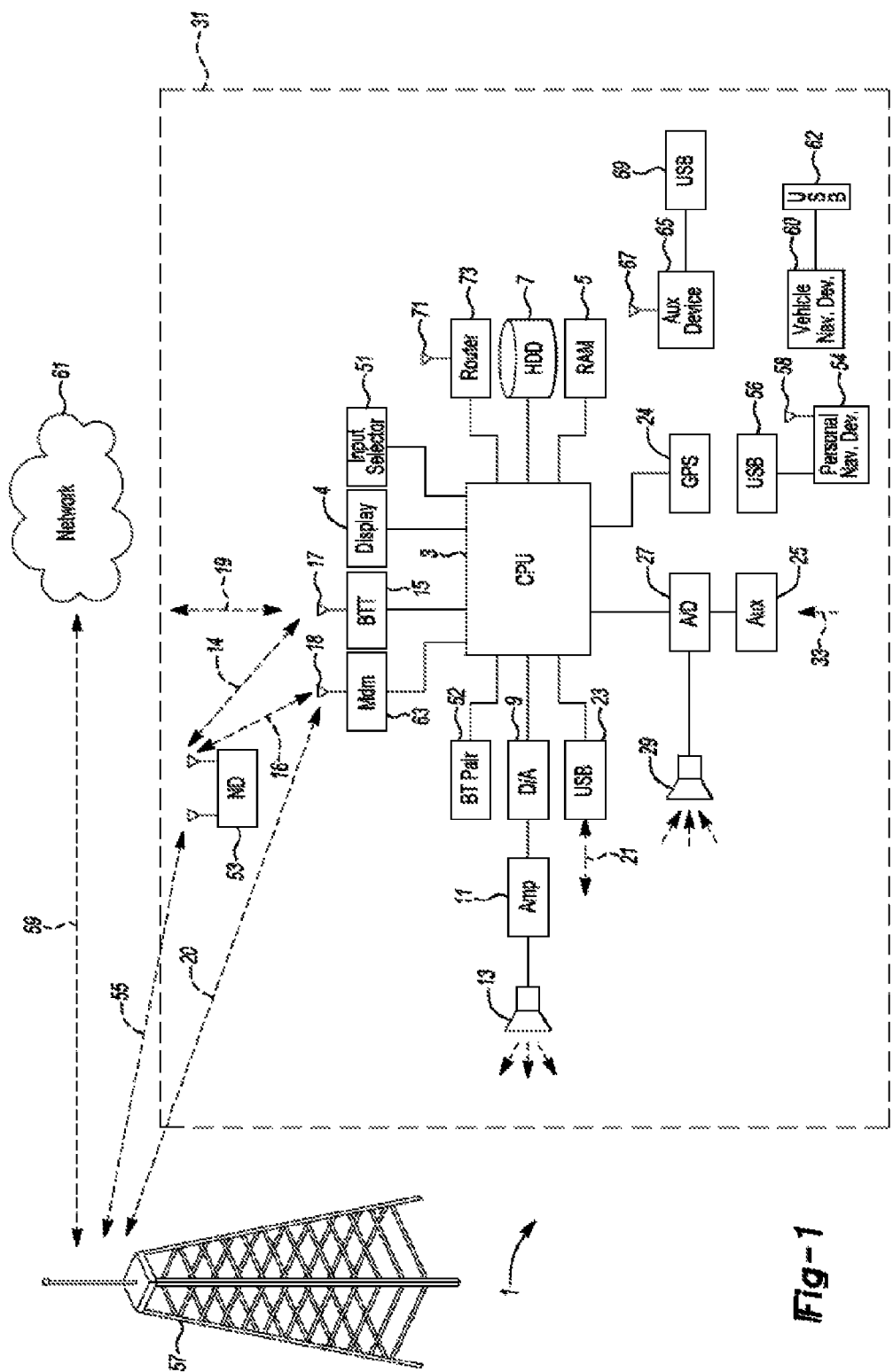
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

As previously noted, it can be cumbersome to have a customer retrieve a VIN number from a vehicle and provide the VIN to a mobile application or a website, in order to gain remote access to a vehicle. The VIN is often not conveniently located, and transcribing the VIN to a mobile application or website may result in errors. In addition, the VIN can typically be seen from outside the vehicle, so if a user with nefarious intent wants to remotely access the vehicle, and only the VIN is needed, the user can obtain the VIN without the knowledge of the vehicle owner.

In the illustrative embodiments, a customer would select "get pin" or another suitable designator from an in-vehicle screen. In this manner, the remote accessor would at least have to obtain access to a powered vehicle in order to generate a personal identification number (PIN). The screen, for example, may reside in the cluster or in a touch control panel.

After the user requests the PIN, the vehicle may send, through a connected wireless device, for example, a request to a backend server for a PIN. The server, in turn, may provide a randomly generated PIN to the vehicle. In at least one example, the PIN is timeboxed and would expire in a short period (e.g., without limitation, minutes or even seconds).

On a phone or website, there would be an entry point for the PIN. This would be used to verify the mobile device or computer attempting to access the vehicle. The cloud server has knowledge of which PINS correspond to which VINS. Upon correct PIN entry, the user can be given remote access rights to the vehicle for which the corresponding was PIN generated. Incorrect PIN entry more than a predetermined number of times can result in lockout of the device or computer, to prevent brute force attacks. Once authenticated, the authentication can persist for any period of time, including indefinitely.

Figure 2:
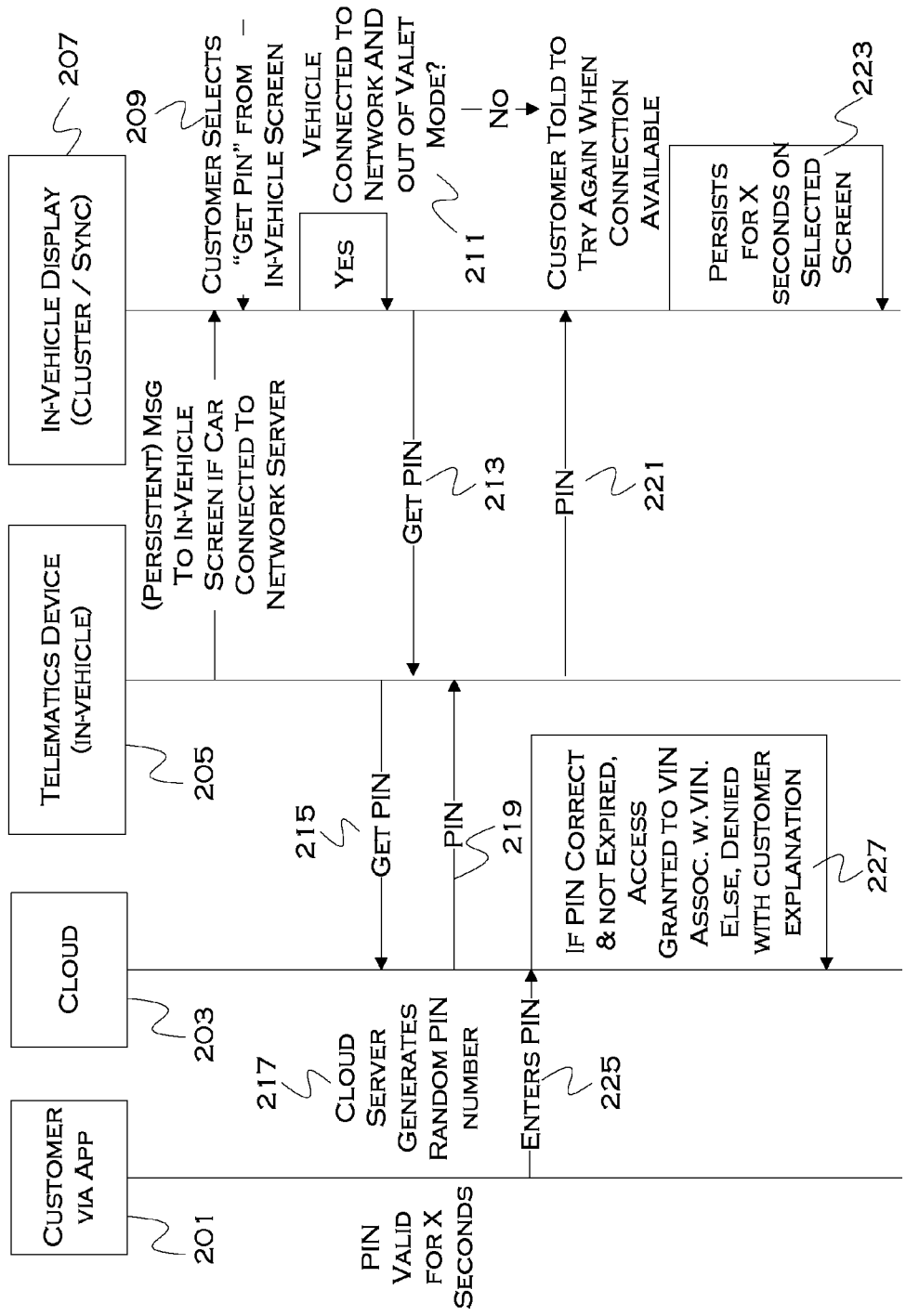
FIG. 2 shows an illustrative example of interaction between systems implementing exemplary illustrative embodiments.

FIG. 2 shows an illustrative example of interaction between systems implementing exemplary illustrative embodiments. In this illustrative example, there are several systems and/or entities which interact to execute an entire illustrative authentication process.

The interaction begins in this example at the in-vehicle display 207. As noted, this can be in the cluster or part of a touch control panel. Here, the customer initiates the process by selecting "get PIN" or a similar identifier from the in-vehicle interface 209. The process then checks if the vehicle is connected to a remote server 211.

Connection to a remote server can be established through a wireless device in wired or wireless communication with the vehicle computing system. If the vehicle is not currently connected (e.g., no wireless device and/or no connectivity is available, due to, for example, no wireless signal on the device, such as deep in a parking garage), the process may instruct the customer to try the PIN request again at a later time. On the other hand, if the vehicle is connected (and out of any Valet mode, in this example, to prevent a valet from requesting a PIN), in vehicle computer will send a "get PIN" request 213 to an in-vehicle telematics device 205. The telematics device will handle communication between the vehicle computer(s) and any remote server(s).

The telematics device may then send a "get PIN" request to a remote server 215. The remote server 203 can handle any verification of the request, as well as receive any vehicle identifiers associated with the request. By associating a particular request, and subsequently generated data, with a particular vehicle, the process can ensure that the correct vehicle access is provided for a user entering the PIN in an access-requesting application or device.

The remote server will generate a random PIN number for use by the vehicle 217. This PIN, as previously noted, may have an expiration period associated therewith. The generated PIN may then be sent back to the vehicle 219, where it is received by the telematics device.

While the PIN could be logged at the vehicle, logging is not necessarily required, since the remote server can authenticate a requesting application/device for vehicle access. In the remote server authentication instance, credentials can be provided to the requesting device or application (such as a public/private key) so that future access requests to the vehicle can be approved on the basis of the credentials. On the other hand, the PIN could additionally or alternatively be logged at the vehicle, and remote access requests could be verified at the vehicle by comparing the logged PIN to an entered PIN. This may be useful if connection to the remote server is spotty, making validation of the application/device difficult visa vie the remote server.

After the telematics unit receives the PIN, the PIN is passed to the display 221, where it can be displayed for the customer's consumption. The PIN may be displayed in vehicle for some fixed period of time 223, until the customer informs the vehicle that the PIN has been recorded, or display may persist/end under any other suitable criteria.

At some point in time prior to the expiration of the PIN, if the PIN has an expiration, the customer may enter the PIN 225 in a mobile device or application running on a mobile device or computer remote from the vehicle 201. In this example, the cloud receives the PIN from the mobile device, and checks the PIN for validity. If the PIN is a valid, non-expired PIN, the customer may be granted access to the vehicle to which the PIN corresponds 227.

In another example, if the cloud is not available or in a direct-access model, the verification process may be performed by a vehicle computing system in communication with the mobile device or computing system.

Once the PIN has been authenticated by the appropriate system, the mobile device, remote system, application, etc. is provided with access rights and credentials. These rights and credentials may persist for a predetermined period of time, a customer-specified period of time, indefinitely or based on any other suitable paradigm for expiration.

Since the PIN was generated by an authorized user accessing the vehicle (presumably), the user's access rights cannot, in at least one example, be terminated by a person in the vehicle. Further, the PIN can be used for quick and accurate provision of to authorized remote and/or mobile access for any number of mobile devices, applications and remote systems. The customer will also receive real-time feed back if the access/PIN generation cannot take place due to a lack of connectivity, so no confusing, failed attempts to access a disconnected vehicle through use of a VIN will be attempted.

Figure 3:
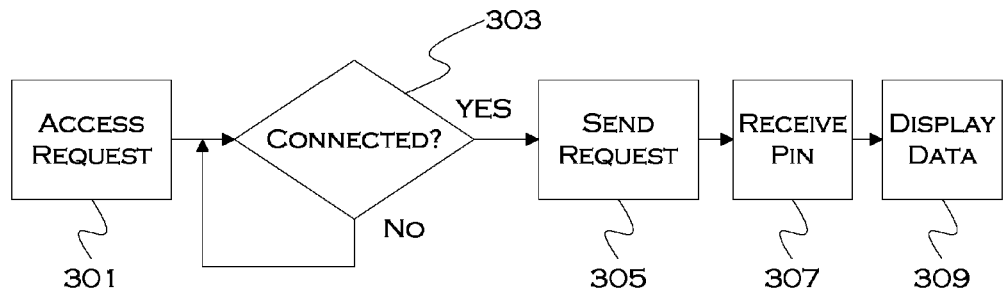
FIG. 3 shows an illustrative example of a pin request.

FIG. 3 shows an illustrative example of a pin request. In this illustrative example, the process is an in-vehicle process through which a customer attempts to request a PIN for remote vehicle access authentication. The process first receives an access request from a customer 301, which is typically input via a vehicle interface.

Since the process, in this example, needs access to a remote server for PIN generation, the process will check to see if the system is currently connected to a remote server 303. In another example, where direct communication may be possible, the process may generate a local PIN for use in direct connection. This PIN could be temporary, requiring later authentication through the remote server when a connection is available, or the PIN could provide persistent access, if sufficient assurances of security are present.

In this example, the process waits until the vehicle is connected to the remote server (possibly providing non-connected status feedback if desired), and, once connection is established, the process will send a request for PIN generation.

Once the remote server has completed the PIN generation process, the local process will receive back the generated PIN 307. This PIN can then be displayed for the user 309 and/or stored locally as appropriate. The user can then input the displayed PIN for use in authenticating the mobile device.

Figure 4:
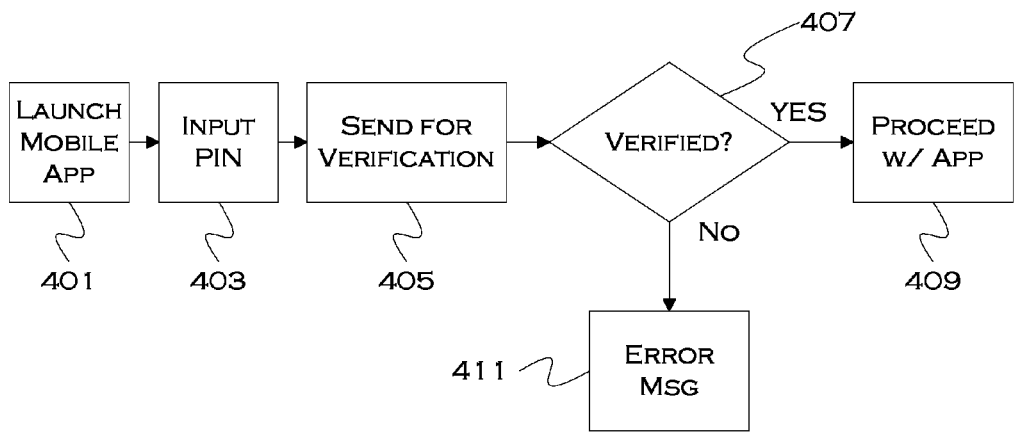
FIG. 4 shows an illustrative example of a mobile access request.

FIG. 4 shows an illustrative example of a mobile access request. This is an exemplary process in which the user engages to obtain remote access to the vehicle through a mobile device or other remote system.

In this example, the user is attempting to use a mobile application to access the vehicle remotely. The user first launches the mobile application 401. Mobile applications configured to interface with the vehicle typically do so through the use of an application programming interface (API). This API, along with any relevant instructions, is provided by an OEM for use by application developers. In this example, the application "knows" that it needs access rights to access the vehicle remotely. Resultantly, the application requests that the user input a PIN 403.

Once the PIN is input, the application will send a request to have the PIN validated/verified 405. This validation/verification request can be done at the remote server where the PIN was generated, or it can be done, in some instances, via direct communication with the vehicle. In either event, if the PIN is verified 407, the process can receive back access credentials and/or be approved for access (either authentication process is possible). The application can then proceed 409.

If the PIN is not verified, the process may generate an error message and the user may have to re-enter the PIN. If the message indicates that the PIN is an expired PIN, then the user may have to go through the PIN-request process again to generate a new PIN.

Figure 5A:
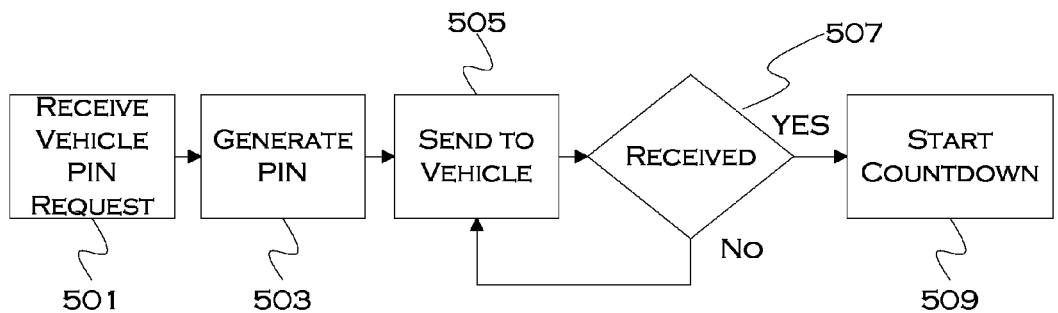
FIG. 5A shows an illustrative example of a pin generation process.

FIG. 5A shows an illustrative example of a pin generation process. This is the server-side process, in this example, although as noted, PIN generation can occur at the vehicle. In this example, the server-side process receives a PIN generation request from the vehicle 501. This request is generated in response to the request from the user.

In response to the received request from the user, the server-side process generates the PIN for use to remotely access the vehicle 503. The PIN is associated with a particular vehicle at the generation process, so that input of the PIN in a mobile device, for example, will provide access to the associated vehicle. In this example, after the PIN is generated it is sent back to a requesting vehicle 505.

Since the PIN may have a short countdown associated therewith, and because transmission to a vehicle may take some time due to latency and connection difficulty, the process here waits until the vehicle receives the PIN 507. Once the PIN is received at the vehicle, the process starts the expiration countdown 509.

Figure 5B:
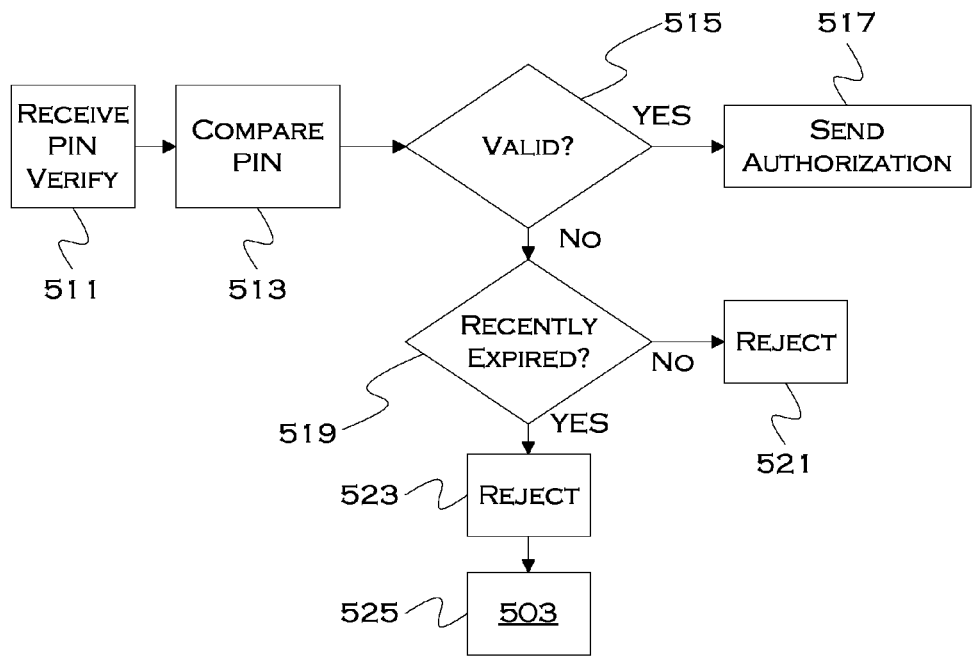
FIG. 5B shows an illustrative example of a verification process.

FIG. 5B shows an illustrative example of a verification process. This is a server-side process in this example, although a similar process could be performed vehicle-side if direct authentication were provided.

In this example, the server receives a request to validate/verify the PIN from a remote device/application seeking to access the vehicle 511. The PIN is compared against currently valid PINS, each of which have a vehicle associated therewith 513. If the PIN is a valid PIN, the process provides credentials and/or access to the vehicle computing system 517.

If the PIN is not valid, the process, in this example, checks to see if the PIN has recently expired 519. If the PIN never existed, or has not recently expired (e.g., in the last few seconds), the process may send back a rejection 521 and terminate.

In this example, if the PIN has recently expired, the process will also reject the request 523, but will also generate a new PIN and send the PIN to the new vehicle. In this manner, the user who is attempting to input a recently expired PIN can receive a new PIN and try again. This can help avoid user annoyance, although the process may also wait until a new PIN request is sent.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a vehicle-access-PIN generation request from a vehicle computing system (VCS);
generate the vehicle-access-PIN;
associate a vehicle with the vehicle-access-PIN;
return the vehicle-access-PIN to the requesting VCS;

receive a validation request, including a validation-PIN, from a non-vehicle computing system (NVCS);
validate the validation-PIN by comparison with stored vehicle-access-PINs to find a match; and
provide access credentials, for a vehicle associated with a stored vehicle-access-PIN that matches the validation-PIN, to the NVCS.

2. The system of claim 1, wherein the processor is configured to associate the vehicle by associating a vehicle identification number (VIN) with the vehicle-access-PIN.

3. The system of claim 1, wherein the processor is configured to set a duration for the vehicle-access-PIN and to invalidate the vehicle-access-PIN upon expiration of the duration.

4. The system of claim 1, wherein the vehicle-access-PIN generation request includes a vehicle identifier.

5. The system of claim 4, wherein the processor is configured to determine which vehicle to associate with the vehicle-access-PIN based on the vehicle identifier.

6. The system of claim 1, wherein the NVCS includes a mobile device.

7. The system of claim 1, wherein the NVCS includes a computer remote from a vehicle.

8. A method comprising:
receiving a vehicle-access-PIN generation request from a vehicle computing system (VCS);
generating the vehicle-access-PIN;
associating a vehicle with the vehicle-access-PIN;
returning the vehicle-access-PIN to the requesting VCS;
receiving a validation request, including a validation-PIN, from a non-vehicle computing system (NVCS);
validating the validation-PIN by comparison with stored vehicle-access-Ms to find a match; and
providing access credentials, for a vehicle associated with a stored vehicle-access-PIN that matches the validation-PIN, to the NVCS.

9. The method of claim 8, further comprising associating the vehicle by associating a vehicle identification number (VIN) with the vehicle-access-PIN.

10. The method of claim 8, further comprising setting a duration for the vehicle-access-PIN and invalidating the vehicle-access-PIN upon expiration of the duration.

11. The method of claim 8, wherein the vehicle-access-PIN generation request includes a vehicle identifier.

12. The method of claim 11, further comprising determining which vehicle to associate with the vehicle-access-PIN based on the vehicle identifier.

13. The method of claim 8, wherein the NVCS includes a mobile device.

14. The method of claim 8, wherein the NVCS includes a computer remote from a vehicle.

15. A non-transitory computer-readable storage medium, storing instructions that, when executed by a processor, cause the processor to perform a method comprising:
receiving a vehicle-access-PIN generation request from a vehicle computing system (VCS);
generating the vehicle-access-PIN;
associating a vehicle with the vehicle-access-PIN;
returning the vehicle-access-PIN to the requesting VCS;
receiving a validation request, including a validation-PIN, from a non-vehicle computing system (NVCS);
validating the validation-PIN by comparison with stored vehicle-access-Ms to find a match; and
providing access credentials, for a vehicle associated with a stored vehicle-access-PIN that matches the validation-PIN, to the NVCS.

16. The storage medium of claim 15, wherein the method further comprises associating the vehicle by associating a vehicle identification number (VIN) with the vehicle-access-PIN.

17. The storage medium of claim 15, wherein the method further comprises setting a duration for the vehicle-access-PIN and invalidating the vehicle-access-PIN upon expiration of the duration.

18. The storage medium of claim 15, wherein the vehicle-access-PIN generation request includes a vehicle identifier.

19. The storage medium of claim 18, wherein the method further comprises determining which vehicle to associate with the vehicle-access-PIN based on the vehicle identifier.

20. The storage medium of claim 15, wherein the NVCS includes a mobile device or a computer remote from a vehicle.

* * * * *